United States Patent
Chou et al.

(10) Patent No.: US 9,038,974 B2
(45) Date of Patent: May 26, 2015

(54) CONNECTING STRUCTURE

(75) Inventors: Che-Yu Chou, New Taipei (TW); Qun Huang, Shenzhen (CN); Tai-Shan Zhu, Shenzhen (CN); Tao Jiang, Shenzhen (CN); Wen-Chih Lan, New Taipei (TW); Jun-Liang Zhang, Shenzhen (CN); Ji-Bing Guo, Shenzhen (CN); Hua-Yong Wang, Shenzhen (CN); Zhou Chen, Shenzhen (CN); Hai-Qian Ge, Shenzhen (CN); Wei-Wei Yu, Shenzhen (CN); Zhi-Jun Shi, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 259 days.

(21) Appl. No.: 13/585,893

(22) Filed: Aug. 15, 2012

(65) Prior Publication Data

US 2013/0161461 A1   Jun. 27, 2013

(30) Foreign Application Priority Data

Dec. 23, 2011   (CN) .......................... 2011 1 0437365

(51) Int. Cl.
```
A47B 96/00      (2006.01)
G06F 1/16       (2006.01)
G06F 3/02       (2006.01)
G06F 3/0354     (2013.01)
H04M 1/02       (2006.01)
```
(52) U.S. Cl.
CPC ............ *G06F 1/1656* (2013.01); *G06F 3/0202* (2013.01); *H04M 1/0254* (2013.01); *G06F 3/03543* (2013.01)

(58) Field of Classification Search
USPC ................. 248/689, 691, 200, 200.1, 225.11, 248/25.21, 229.1, 918, 224.8, 220.21; 361/679.01, 679.02, 679.08, 679.09, 361/679.3, 679.55, 679.56, 679.57, 679.58, 361/679.59
See application file for complete search history.

(56) References Cited

U.S. PATENT DOCUMENTS

| | | | | |
|---|---|---|---|---|
| 5,704,698 | A * | 1/1998 | Lin | 312/208.1 |
| 5,995,082 | A * | 11/1999 | Lakoski | 345/168 |
| 6,128,186 | A * | 10/2000 | Feierbach | 361/679.27 |
| 6,163,326 | A * | 12/2000 | Klein et al. | 345/156 |
| 6,442,019 | B1 * | 8/2002 | Lim | 361/679.4 |
| 7,330,923 | B2 * | 2/2008 | Wenstrand et al. | 710/303 |
| 7,494,351 | B2 * | 2/2009 | Chiang et al. | 439/148 |
| 7,948,741 | B2 * | 5/2011 | Fan | 361/679.1 |
| 2002/0167482 | A1 * | 11/2002 | Yin | 345/156 |
| 2006/0082553 | A1 * | 4/2006 | Lin | 345/163 |
| 2007/0014083 | A1 * | 1/2007 | Tanaka et al. | 361/683 |

(Continued)

*Primary Examiner* — Monica Millner
(74) *Attorney, Agent, or Firm* — Novak Druce Connolly Bove + Quigg LLP (57) ABSTRACT

A connecting structure received in a main device for connecting an auxiliary apparatus. The connecting structure includes a retracting part formed on a bottom board of the main device and close to a sidewall of the main device and a clamping part. The clamping part is pivotablly mounted on the bottom board and pivotally connected to the retracting part. The retracting part drives the clamping part to extend out of the main device via an opening defined on the sidewall for connecting the auxiliary apparatus when the auxiliary apparatus needs to be mounted on the main device. The retracting part retracts the clamping part into the main device when the auxiliary apparatus is unmounted from the main device.

12 Claims, 6 Drawing Sheets

(56) References Cited

U.S. PATENT DOCUMENTS

| | | |
|---|---|---|
| 2007/0132731 A1* | 6/2007 | Lin et al. ............. 345/163 |
| 2008/0310094 A1* | 12/2008 | Burns ............. 361/683 |
| 2009/0002320 A1* | 1/2009 | Karmazyn ............. 345/168 |
| 2009/0244836 A1* | 10/2009 | Leng et al. ............. 361/679.58 |
| 2010/0085705 A1* | 4/2010 | Yin et al. ............. 361/679.58 |
| 2010/0246119 A1* | 9/2010 | Collopy et al. ............. 361/679.55 |
| 2010/0250816 A1* | 9/2010 | Collopy et al. ............. 710/303 |
| 2011/0235275 A1* | 9/2011 | Su et al. ............. 361/692 |
| 2012/0155003 A1* | 6/2012 | Dondurur et al. ............. 361/679.08 |
| 2013/0120923 A1* | 5/2013 | Yu ............. 361/679.19 |

* cited by examiner

CONNECTING STRUCTURE

BACKGROUND

1. Technical Field

The present disclosure relates to connecting structures, and more particularly, to a connecting structure for connecting a detachable accessory.

2. Description of Related Art

Generally, an accessory is connected to a main device via a number of fasteners, such as a number of bolts. However, to mount or unmount the accessory from the main device, the bolts need to be screwed or unscrewed one by one, which is inconvenient and results in low efficiency.

Therefore, it is desirable to provide a connecting structure which can overcome the above-mentioned problems.

BRIEF DESCRIPTION OF THE FIGURE

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Embodiments of the present disclosure will now be described in detail below, with reference to the accompanying drawings.

Figure 1:
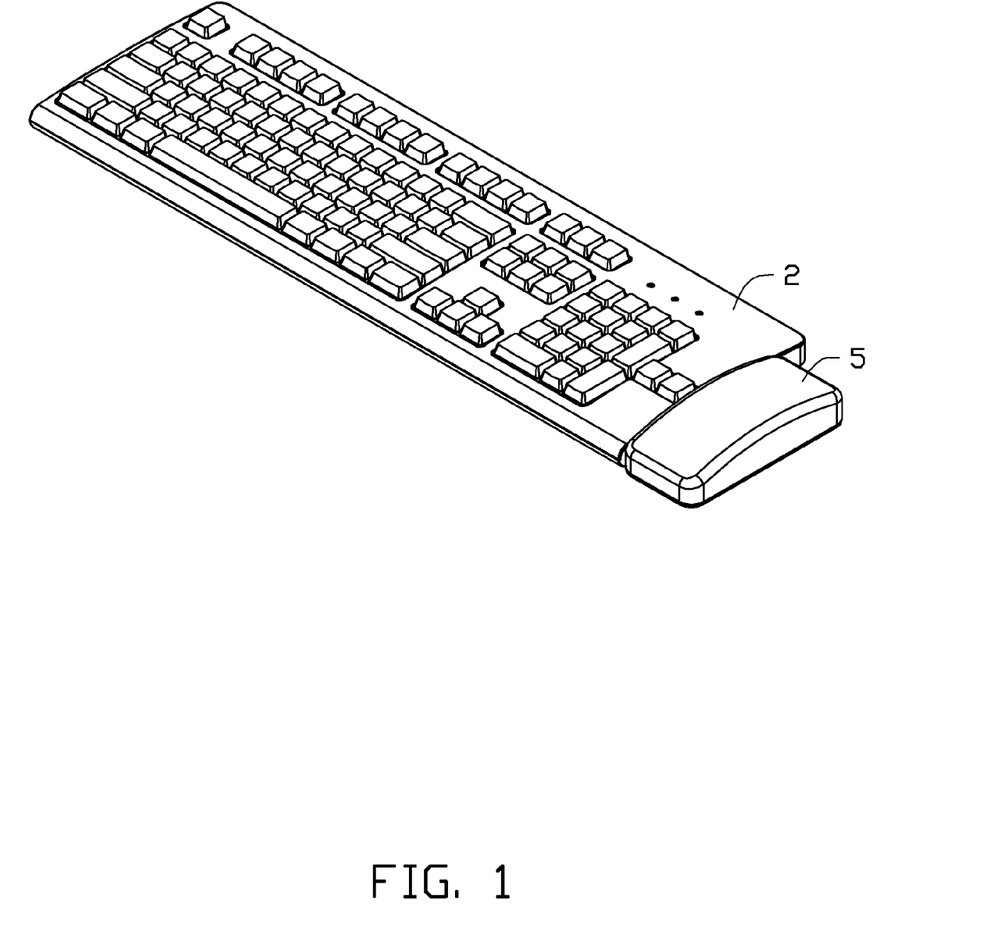
FIG. 1 is an isometric view of a main device and an auxiliary apparatus to be mounted on the main device.
Figure 2:
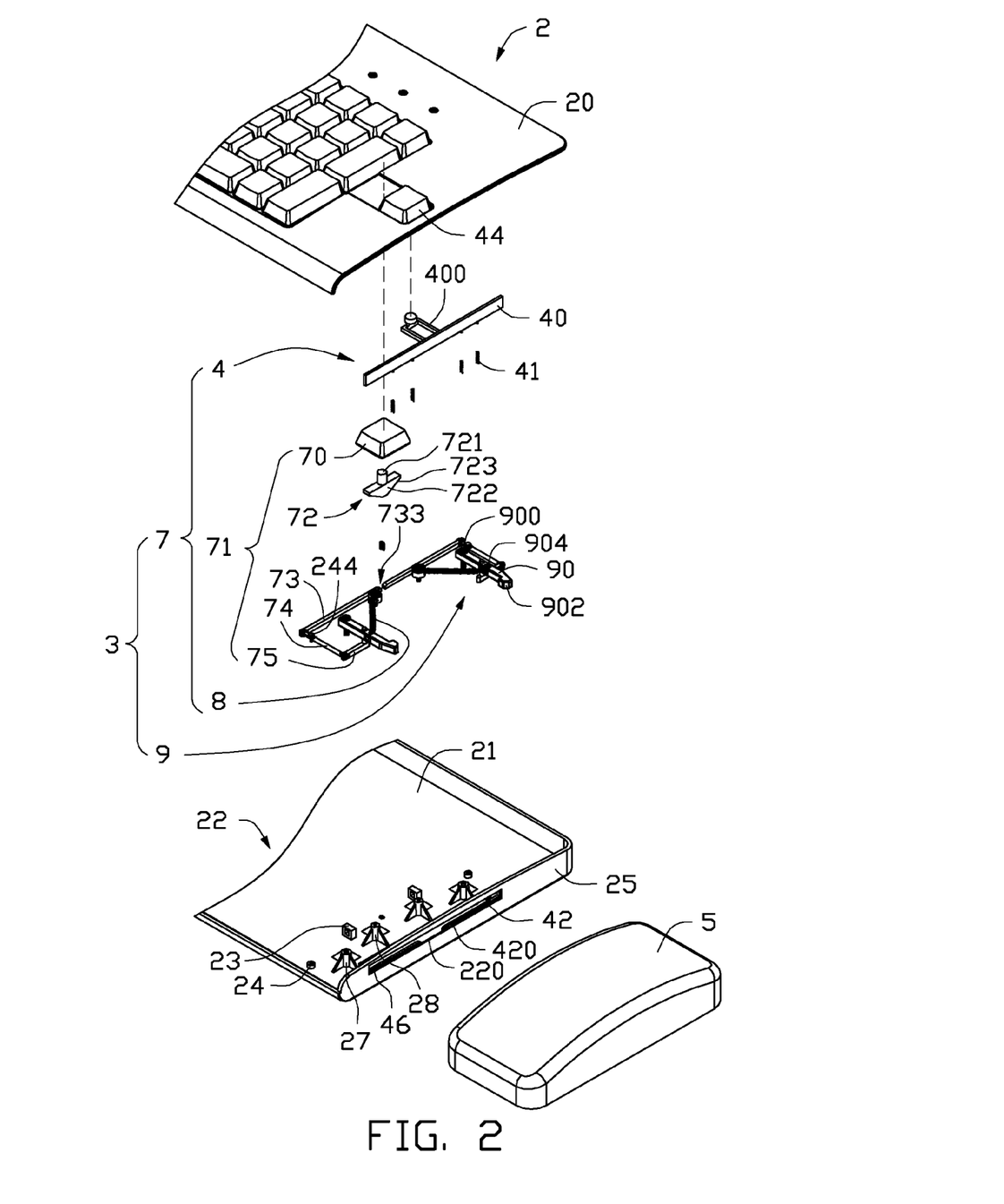
FIG. 2 is an exploded, isometric view of a connecting structure received in the main device of FIG. 1 in accordance with one embodiment of present disclosure.

Referring to FIGS. 1 and 2, a connecting structure 3, in accordance with an exemplary embodiment, is received in a main device 2 for connecting an auxiliary apparatus 5. The main device 2 includes a receiving case 22 and a cover 20 to cover the receiving case 22. The receiving case 22 includes a bottom board 21 and a sidewall 25 perpendicularly connected to the bottom board 21, and defines an opening 220 on the sidewall 25. The connecting structure 3 includes a retracting part 7 and a clamping part 9. The retracting part 7 is set on the bottom board 21 and close to the opening 220. The retracting part 7 drives the clamping part 9 to extend out of the receiving case 22 via the opening 220 for connecting the auxiliary apparatus 5 when the auxiliary apparatus 5 needs to be mounted on the main device 2. The retracting part 7 retracts the clamping part 9 into the receiving case 22 when the auxiliary apparatus 5 is dismounted from the main device 2. The main device 2 may be an electronic device, such as a computer or a mobile phone, etc. The auxiliary apparatus 5 may be an accessory of the electronic device. In this embodiment, the main device 2 is a keyboard and the auxiliary apparatus 5 is a mouse.

The retracting part 7 includes a door mechanism 4, a transmission mechanism 71, and a pair of resilient elements 8.

Figure 3:
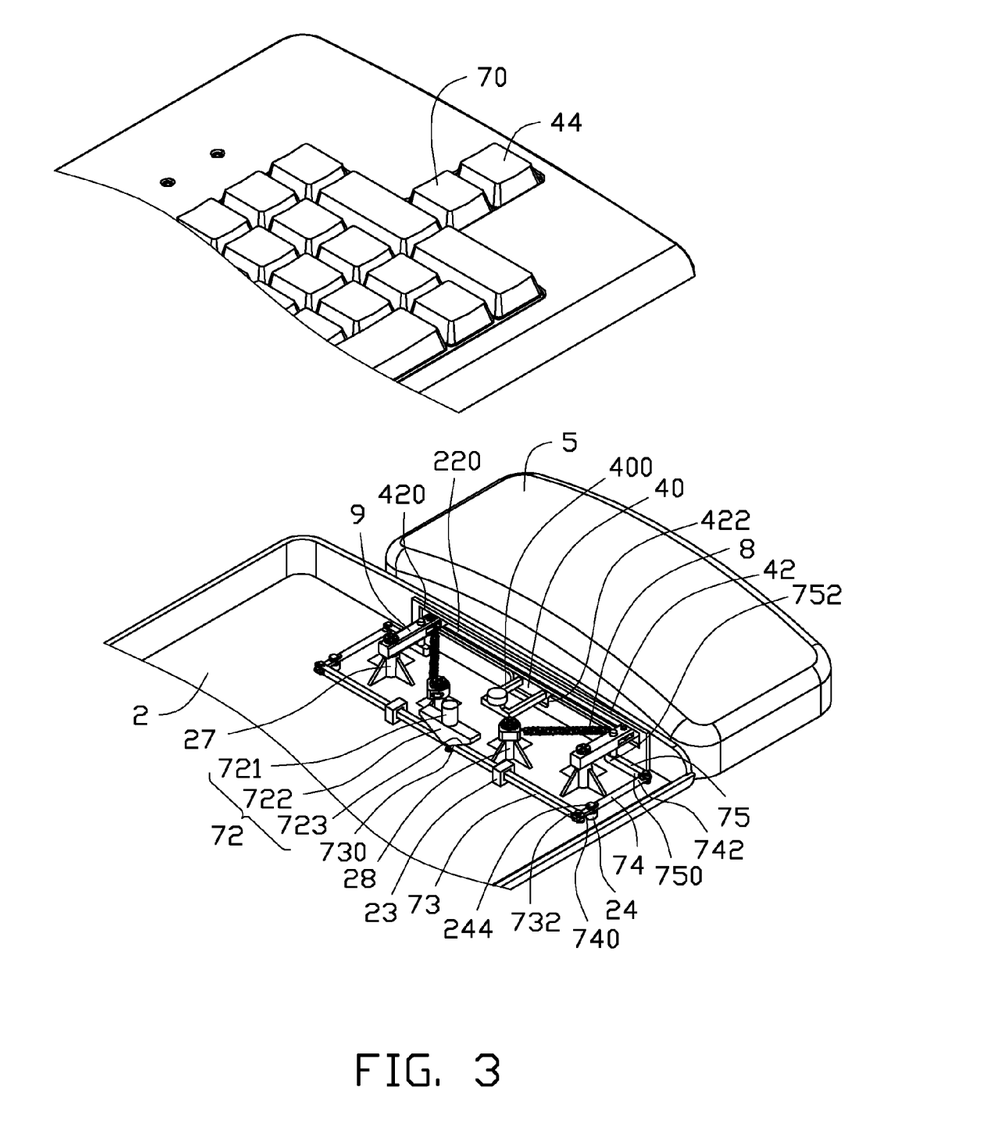
FIG. 3 is a partially exploded, isometric view of the connecting structure of FIG. 2.

Referring to FIGS. 2 and 3, the door mechanism 4 includes a first button 44, a positioning board 42, a movable board 40, and a number of restoring springs 41. The positioning board 42 is perpendicularly fixed on the bottom board 21 near the opening 220 and faces an internal side of the sidewall 25. A receiving gap 46 is defined between the positioning board 42 and the sidewall 25. The positioning board 42 defines a through hole 420 corresponding to the opening 220 therein. The shape of the through hole 420 is substantially the same as the shape of the opening 220. The positioning board 42 defines a cutout 422 at the middle part of a periphery of the through hole 420 closest to the bottom board 21. The movable board 40 is substantially rectangular, and extends an engaging arm 400 from a side surface of the movable board 40 towards an interior of the receiving case 22. The movable board 40 is received in the receiving gap 46 with the engaging arm 400 aligning with the cutout 422. A bottom periphery of the movable board 40 is connected to the bottom board 21 via the restoring springs 41. Thus, the movable board 40 can resiliently move along a direction perpendicularly to the bottom board 21.

The first button 44 is set on the cover 20 and aligns with the engaging arm 400. When the first button 44 is not pressed, the first button 44 is separated from the engaging arm 400. The movable board 40 blocks the opening 220. When the first button 44 is pressed downward, the first button 44 contacts the engaging arm 400 and pushes the engaging arm 400 to move downward in the cutout 422. The movable board 40 is then driven to move downwards and expose the opening 220.

The transmission mechanism 71 includes a second button 70, a transmission block 72, a pair of first transmission rods 73, a pair of second transmission rods 74, and a pair of third transmission rods 75.

The transmission block 72 includes a main body 722 and a connecting shaft 721 extending from one end surface of the main body 722. The main body 722 is substantially triangular, and includes a pair of inclined engaging side surfaces 723. The connecting shaft 721 is connected to the second button 70 set on the cover 20.

The pair of first transmission rods 73 are correspondingly sleeved in a pair of guiding blocks 23 formed on the bottom board 21 and slide along a direction parallel to the sidewall 25 in which the opening 220 is defined. Each of the first transmission rods 73 includes an inclined engaging end surface 730 facing the other first transmission rod 73 and a first connecting end 732 opposite to the engaging end surface 730. An engaging gap 733 is defined between a pair of engaging end surfaces 730 facing each other.

A pair of screwing bumps 24 are formed on the bottom board 21 and positioned between the guiding blocks 23 and the opening 220. Each of the second transmission rods 74 includes a second connecting end 740 and a third connecting end 742 opposite to the second connecting end 740. The second connecting end 740 of each second transmission rod 74 is pivotablly connected to the first connecting end 732. Each of the second transmission rods 74 is pivotablly connected to one of the screwing bumps 24 at a rotation joint 244 of the second transmission rod 74 formed between the second connecting end 740 and the third connecting end 742. A distance between the rotation joint 244 and the second connecting end 740 is less than the distance between the rotation joint 244 and the third connecting end 742.

The clamping part 9 includes a pair of clamps 90 and a pair of first screwing posts 27. Each of the clamps 90 includes a sixth connecting end 900 and a clamping end 902 opposite to the sixth connecting end 900. The first screwing posts 27 are formed on the bottom board 21 and positioned in an area surrounded by the first transmission rods 73 and the second transmission rods 74. The sixth connecting end 900 of each clamp 90 is pivotablly connected to a top end of the first screwing post 27. The height of the first screwing post 27 is equal to the distance between the opening 220 and the bottom board 21. Thus, the clamping end 902 can extend out of the receiving case 22 via the opening 220 when the clamps 90 rotate to a position where the clamp 90 is perpendicular to the sidewall 25. Because the first screwing posts 27 are higher than the screwing bumps 24, the clamps 90 rotate above a plane defined by the first transmission rods 73, the second transmission rods 74 and the third transmission rods 75.

Each of the third transmission rods 75 includes a fourth connecting end 750 and a fifth connecting end 752 opposite to the fourth connecting end 750. The fourth connecting end 750 of each third transmission rod 75 is pivotablly connected to the third connecting end 742. The third transmission rods 742 are correspondingly pivotably connected to the clamps 90 via a pair of shafts correspondingly extending upwards from the fifth connecting ends 752.

A pair of second screwing posts 28 are formed on the bottom board 21 and positioned between the pair of first screwing posts 27. A distance between the second screwing posts 28 and the first transmission rods 73 is less than the distance between the first screwing posts 27 and the first transmission rods 73. One end of each resilient element 8 is correspondingly connected to a top end of one of the second screwing posts 28. The other end of each resilient element 8 is correspondingly connected to a connection joint 904 of one of the clamps 90. The connection joint 904 is between the third transmission rod 75 and the clamping end 902.

Figure 4:
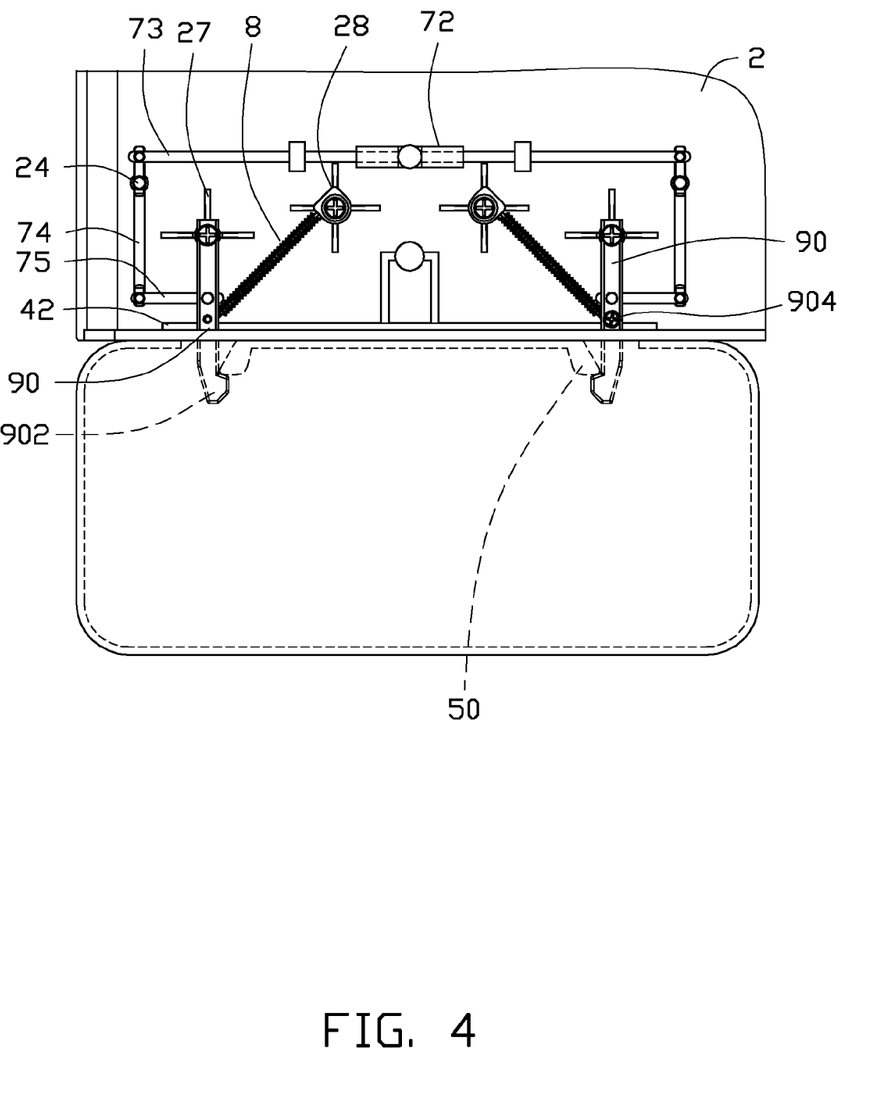
FIG. 4 is an assembled, isometric, top view of the connecting structure of FIG. 3, when the auxiliary apparatus is connected to the main device.

Referring to FIGS. 3 and 4, in operation, when the auxiliary apparatus 5 needs to be mounted on the main device 2, the first button 44 is pressed downwards to drive the movable board 40 to move downwards and expose the opening 220. The resilient elements 8 correspondingly push the pair of clamps 90 to rotate apart from each other. The clamping end 902 of each clamp 90 stretches out of the receiving case 22 via the opening 220 to connect with the auxiliary apparatus 5. In the embodiment, the auxiliary apparatus 5 includes an engaging structure 50, for example a pair of hooks, formed on an outer sidewall of the auxiliary apparatus 5. Thus, the clamping ends 902 of the main device 2 can easily connect with the auxiliary apparatus 5 via the engaging structures 50.

Figure 6:
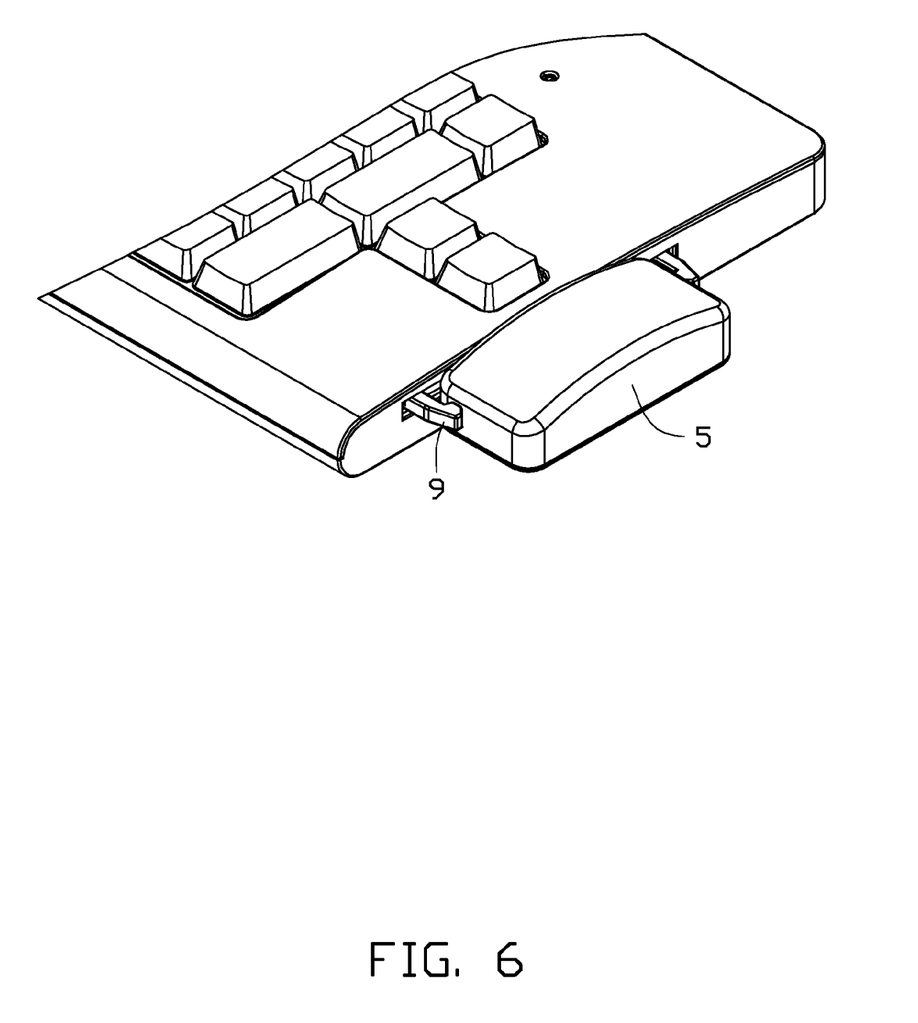
FIG. 6 is an isometric view of the main device connecting the auxiliary apparatus by clamping an outer sidewall of the auxiliary apparatus.

Referring to FIG. 6, in other embodiments, the clamping ends 902 can directly hug the outer sidewall of the auxiliary apparatus 5, and the engaging structures 50 are omitted.

Figure 5:
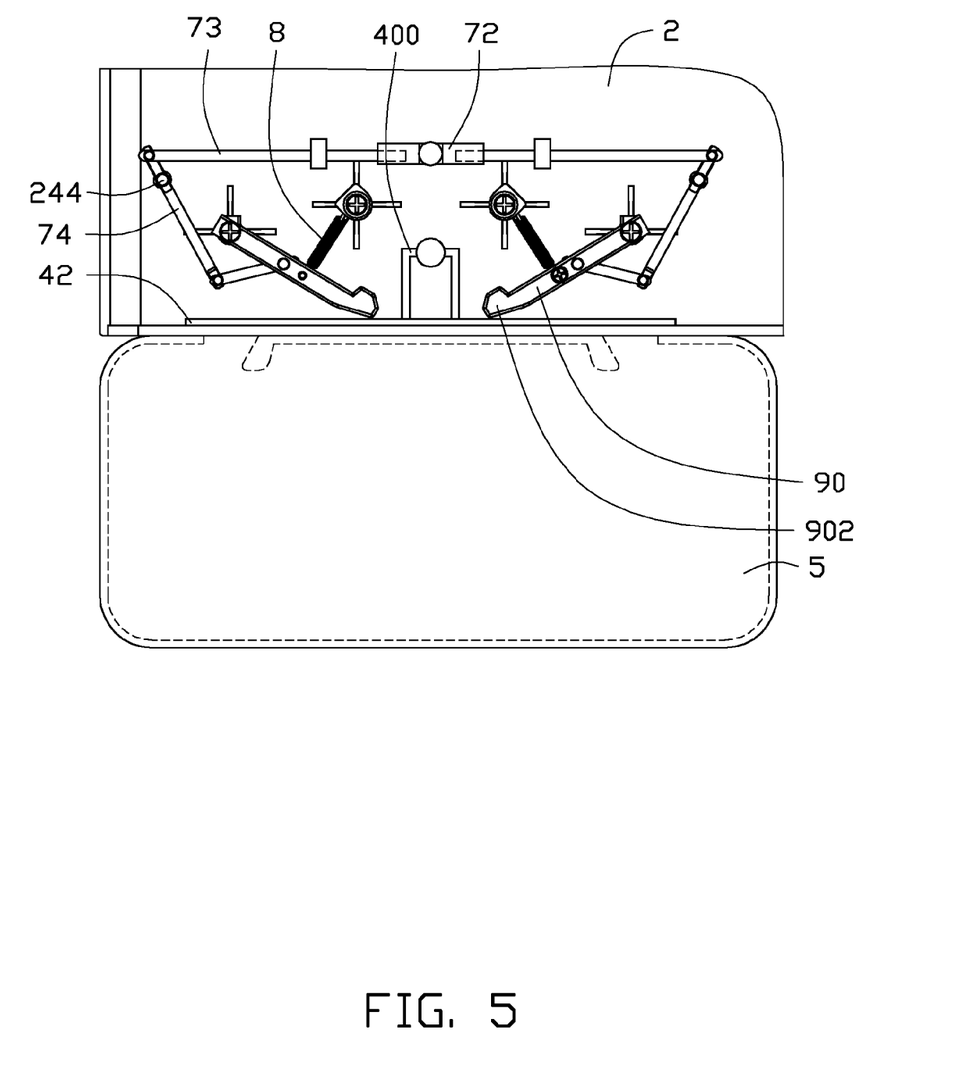
FIG. 5 is an assembled, isometric, top view of the connecting structure of FIG. 3, when the auxiliary apparatus is disconnected from the main device.

Referring to FIGS. 3 and 5, when the auxiliary apparatus 5 has been unmounted from the main device 2, the second button 70 is pressed downwards to allow the transmission block 72 to move downwards. The transmission block 72 is inserted into the engaging gap 733 (see FIG. 2), the inclined engaging side surfaces 730 correspondingly slidably engage with the inclined engaging end surface 723 to drive the pair of first transmission rods 73 to slide apart from each other. The pair of second transmission rods 74 is driven to rotate towards each other by the first transmission rods 73. The second transmission rods 74 correspondingly drive the pair of clamps 90 to rotate towards each other via the pair of third transmission rods 75. The resilient elements 8 are compressed when the pair of clamps 90 rotate towards each other. When the clamping ends 902 are totally retracted in the receiving case 22, the movable board 40 is forced to move upwards by the restoring springs 41 and blocks the opening 220. Then, the clamping ends 902 resist against the movable board 40 under a restoring force of the resilient elements 8. Next time the movable board 40 exposes the opening 220, the clamping ends 902 will extend out of the receiving case 22 under the restoring force of the resilient elements 8.

While various exemplary and preferred embodiments have been described, it is to be understood that the disclosure is not limited thereto. To the contrary, various modifications and similar arrangements (as would be apparent to those skilled in the art) are intended to also be covered. Therefore, the scope of the appended claims should be accorded the broadest interpretation so as to encompass all such modifications and similar arrangements.

What is claimed is:

1. A connecting structure received in a main device for connecting an auxiliary apparatus, the main device comprising a bottom board and a sidewall substantially perpendicularly connected to the bottom board, the main device defining an opening on the sidewall, the connecting structure comprising:
a retracting part formed on the bottom board and close to the sidewall; and
a clamping part pivotablly mounted on the bottom board and pivotally connected to the retracting part;
wherein the retracting part drives the clamping part to extend out of the main device via the opening defined on the sidewall for connecting the auxiliary apparatus when the auxiliary apparatus is mounted on the main device; the retracting part retracts the clamping part into the main device when the auxiliary apparatus is unmounted from the main device, the auxiliary apparatus comprises a pair of hooks formed on an outer sidewall of the auxiliary apparatus, and the clamping part engages with an engaging structure for connecting the auxiliary apparatus.

2. The connecting structure as claimed in claim 1, wherein the retracting part comprises a door mechanism and a first button to control the door mechanism to expose or block the opening.

3. The connecting structure as claimed in claim 2, wherein the door mechanism comprises a positioning board perpendicularly fixed on the bottom board and facing the opening, a movable board movably received in a receiving gap defined between the positioning board and the sidewall, and a plurality of restoring springs connecting a bottom periphery of the movable board with the bottom board, the movable board extends an engaging arm from a side surface of the movable board towards an interior of the main device, and the first button aligns with the engaging arm and drives the movable board to move downwards via the engaging arm when the first button is pressed downwards.

4. The connecting structure as claimed in claim 3, wherein the positioning board defines a through hole corresponding to the opening, a shape of the through hole is substantially the same as the shape of the opening, the engaging arm passes through the through hole to engage with the first button, the positioning board defines a cutout at a middle part of a periphery of the through hole closest to the bottom board, the engaging arm moves in the cutout when the moveable board is pushed downwards.

5. The connecting structure as claimed in claim 1, wherein the retracting part comprises a transmission mechanism and a second button to drive the transmission mechanism to retract the clamping part.

6. The connecting structure as claimed in claim 5, wherein the transmission mechanism comprises a transmission block and a pair of first transmission rods, one end of the transmission block is connected to the second button, the pair of first transmission rods are correspondingly sleeved in a pair of guiding blocks formed on the bottom board and slide along a direction parallel to the sidewall in which the opening is defined, the transmission block is inserted into an engaging gap defined between the pair of first transmission rods to drive the pair of first transmission rods slide apart from each other when the second button is pressed downwards.

7. The connecting structure as claimed in claim 6, wherein the transmission mechanism further comprises a pair of second transmission rods and a pair of third transmission rods, the pair of second transmission rods and the pair of third transmission rods are correspondingly pivotally connected head-to-tail in sequence to a pair of ends of the first transmission rods opposite to the engaging gap.

8. The connecting structure as claimed in claim 7, wherein each of the pair of second transmission rods is pivotally connected to a screwing bump at a rotation joint formed between the pair of first transmission rod and the pair of third transmission rod, the screwing bump is formed on the bottom board and positioned between the guiding blocks and the opening.

9. The connecting structure as claimed in claim 8, wherein each of the pair of second transmission rods comprises a second connecting end pivotally connected to the pair of first transmission rod and a third connecting end pivotally connected to the pair of third transmission rod, a distance between the rotation joint and the second connecting end is greater than the distance between the rotation joint and the third connecting end.

10. The connecting structure as claimed in claim 9, wherein the clamping part comprises a pair of clamps and a pair of first screwing posts formed on the bottom board and positioned in an area abutting the pair of first transmission rods and the pair of second transmission rods, each of the clamps comprises a connecting end pivotally connected to a top end of one of the first screwing posts and a clamping end opposite to the connecting end.

11. The connecting structure as claimed in claim 10, wherein the retracting part further comprises a pair of resilient elements, one end of each resilient element is correspondingly connected to a top end of a second screwing post, the other end of each resilient element is correspondingly connected to a connection joint of one of the clamps to provide a force to push the pair of clamps.

12. The connecting structure as claimed in claim 11, wherein the pair of third transmission rods are correspondingly pivotally connected to the pair of clamps at a position between the connection joint and the top end of the second screwing post.

* * * * *